US011846240B2

United States Patent
Shelby et al.

(10) Patent No.: US 11,846,240 B2
(45) Date of Patent: Dec. 19, 2023

(54) ENGINE IDLE SPEED CONTROL

(71) Applicant: Ford Global Technologies, LLC, Dearborn, MI (US)

(72) Inventors: Michael Shelby, Plymouth, MI (US); Thomas Leone, Ypsilanti, MI (US); Christopher Cundy, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/446,105

(22) Filed: Aug. 26, 2021

(65) Prior Publication Data

US 2023/0068919 A1  Mar. 2, 2023

(51) Int. Cl.
F02D 31/00 (2006.01)

(52) U.S. Cl.
CPC ......... F02D 31/003 (2013.01); F02D 31/008 (2013.01); F02D 2200/025 (2013.01)

(58) Field of Classification Search
CPC .. F02D 31/003; F02D 31/007; F02D 41/0002; F02D 41/08; F02D 41/16; F02D 2200/025; F02D 2009/0233
USPC ......... 701/103, 110, 111; 123/339.1, 339.14, 123/339.16
See application file for complete search history.

(56) References Cited

U.S. PATENT DOCUMENTS

| | | | |
|---|---|---|---|
| 5,224,452 A | 7/1993 | Tomizawa | |
| 5,857,445 A | 1/1999 | Shimada et al. | |
| 6,334,424 B1 | 1/2002 | Ito | |
| 6,659,078 B2 | 12/2003 | Bergeon et al. | |
| 6,751,543 B2 | 6/2004 | Gras et al. | |
| 7,174,879 B1* | 2/2007 | Chol | F02D 31/002 123/434 |
| 7,292,932 B1* | 11/2007 | Ledger | B60W 10/06 701/110 |
| 7,779,812 B2 | 8/2010 | Leone et al. | |
| 8,146,565 B2 | 4/2012 | Leone et al. | |
| 8,347,856 B2 | 1/2013 | Leone et al. | |
| 9,966,057 B1* | 5/2018 | Wang | G10K 11/17873 |
| 10,214,219 B2 | 2/2019 | Richards et al. | |

(Continued)

FOREIGN PATENT DOCUMENTS

| | | |
|---|---|---|
| EP | 2713032 A2 | 4/2014 |
| JP | H0960543 A | 3/1997 |

(Continued)

OTHER PUBLICATIONS

Leone, T. et al., "Fuel Economy Benefit of Cylinder Deactivation—Sensitivity to Vehicle Application and Operating Constraints," Proceedings of the International Fall Fuels and Lubricants Meeting and Exposition, Sep. 24, 2001, San Antonia, Texas, 8 pages.

(Continued)

*Primary Examiner* — John Kwon
*Assistant Examiner* — Johnny H Hoang
(74) *Attorney, Agent, or Firm* — Vincent Mastrogiacomo; McCoy Russell LLP

(57) ABSTRACT

A method and a system for adjusting a base idle speed of an engine are described. In one example, the method reduces engine speed according to output of a sensor that senses mechanical vibrations. Once a vibration level exceeds a threshold, engine speed reduction ceases and the base engine idle speed is adjusted according to a present engine speed.

20 Claims, 5 Drawing Sheets

(56) References Cited

U.S. PATENT DOCUMENTS

| | | |
|---|---|---|
| 2002/0072844 A1 | 6/2002 | Gras et al. |
| 2003/0088346 A1 | 5/2003 | Calkins et al. |
| 2003/0196637 A1* | 10/2003 | Bergeon ................ F02P 5/1512 |
| | | 123/406.24 |
| 2005/0135635 A1 | 6/2005 | Prince |
| 2008/0078610 A1* | 4/2008 | Godbold .................. F01N 1/02 |
| | | 181/182 |
| 2009/0065294 A1* | 3/2009 | O'Malley ............ F02M 35/125 |
| | | 123/319 |
| 2014/0083392 A1 | 3/2014 | Cattani et al. |
| 2015/0063582 A1* | 3/2015 | Pan .................. G10K 11/17883 |
| | | 381/71.4 |
| 2015/0100221 A1 | 4/2015 | Routledge et al. |
| 2018/0171919 A1* | 6/2018 | Jung ....................... F02D 41/08 |
| 2019/0308640 A1* | 10/2019 | Miller ................ B60W 30/182 |
| 2019/0376459 A1 | 12/2019 | Pieczko et al. |
| 2020/0010089 A1 | 1/2020 | Ford et al. |
| 2020/0055513 A1* | 2/2020 | Galang ................ B60W 50/14 |
| 2020/0111472 A1* | 4/2020 | Kurz ................ G10K 11/17873 |
| 2022/0203973 A1* | 6/2022 | Dronen ................ B60W 50/14 |

FOREIGN PATENT DOCUMENTS

| | | |
|---|---|---|
| JP | 2002016792 A | 1/2002 |
| JP | 2010175161 A | 8/2010 |

OTHER PUBLICATIONS

Falkowski, A. et al., "Design and Development of the DaimlerChrysler 5.7L HEMI Engine Multi-Displacement Cylinder Deactivation System," SAE Technical Paper 2004-01-2106, May 7, 2004, 12 pages.

Leone, T., Fuel Economy of 5.8L VDE+VCT Engine in Mustang and F150, Using CVSP MBE Methodology, Ford Research and Advanced Engineering Technical Reports, SRR-2006-0052, Apr. 5, 2006, 24 pages.

* cited by examiner

ENGINE IDLE SPEED CONTROL

BACKGROUND/SUMMARY

At low driver demand conditions when an engine is operating at its warmed up operating temperature, an engine may be operated at a base idle speed. The base idle speed may depend on the engine's total number of cylinders, type of motor mounts, vehicle configuration, and other factors. A manufacturer may build an engine and program an engine controller to idle the engine at a base idle speed, which allows the engine to rotate at a speed with an acceptable amount of noise and vibration for every vehicle configuration which uses that engine. For example, a truck may have the same idle speed regardless of wheelbase or cab configuration. However, the base idle speed may be higher than necessary for acceptable noise and vibration for a particular vehicle configuration. Therefore, the engine in that vehicle configuration may consume more fuel than may be needed while idling. Furthermore, a truck may be modified or "upfitted" to become a camper, ambulance, box truck, etc. which may require a higher or lower idle speed for acceptable noise and vibration. In yet another example, the age and/or temperature of elastomer engine mounts and/or body mounts may affect the idle speed required for acceptable noise and vibration.

The inventors herein have recognized the above-mentioned disadvantages and have developed a method for operating an engine, comprising: progressively reducing a speed of the engine via a controller such that an output of a vibration sensor or a sound sensor increases to a threshold level; and adjusting a base idle speed of the engine to the speed of the engine where the output of the vibration sensor or sound sensor is substantially equal to the threshold level.

By reducing an idle speed of an engine according to output of a vibration sensor or a sound sensor, it may be possible to provide the technical result of a lower base engine idle speed. The lower base engine idle speed may reduce fuel consumption and $CO_2$ generation. In addition, the sounds and vibrations that may be generated by the engine may be at acceptable levels when the base engine idle speed is reduced since the base engine idle speed may be revised after noise and vibrations generated by the engine are compared to acceptable levels.

The present description may provide several advantages. In particular, the approach may reduce fuel consumption and $CO_2$ emissions. In addition, the approach may utilize both mechanical vibration sensors and sound sensors (e.g., microphones) so that engine speed may not be reduced at the expense of tactile vibrations or audible sounds. Further, the approach may also apply active noise cancellation and/or active vibration cancellation to allow further reductions of base engine idle speed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
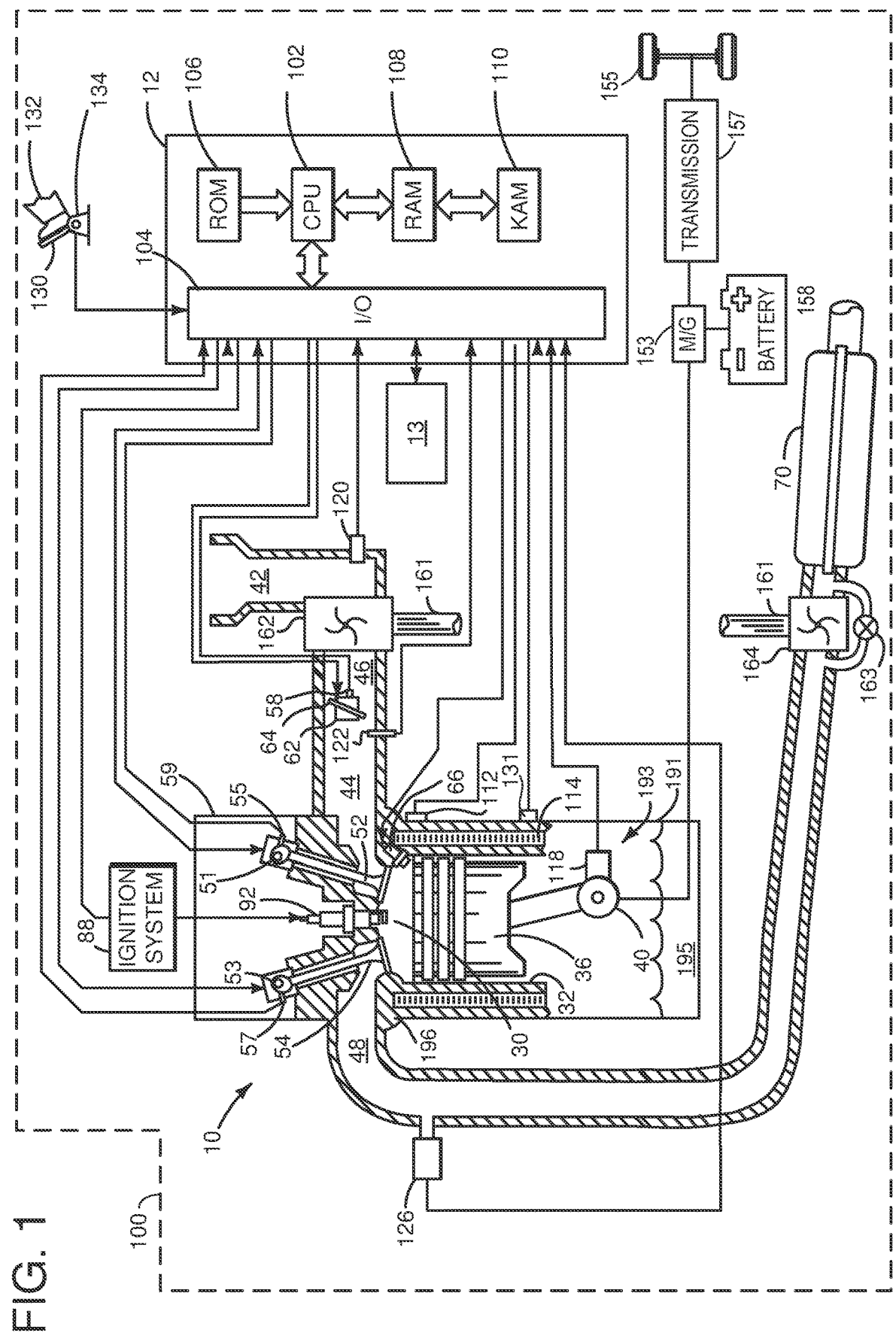
FIG. 1 shows a schematic depiction of one cylinder of an engine.
Figure 2:
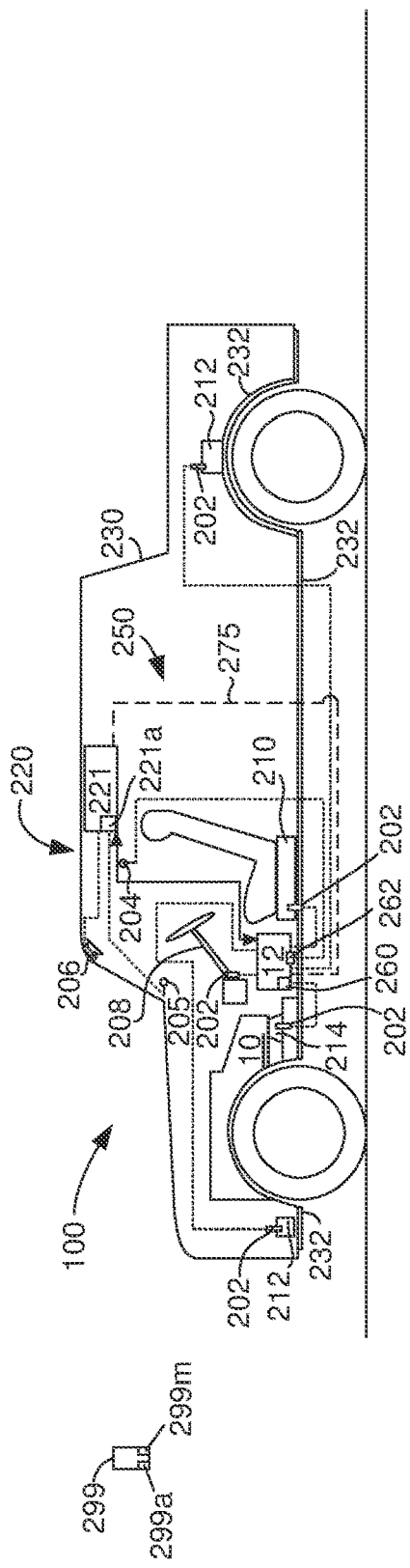
FIG. 2 shows a schematic depiction of the engine of FIG. 1 in a vehicle.

The present description is related to reducing fuel consumption and engine emissions by way of reducing a base idle speed of an engine. The base idle speed of the engine may be a speed at which the engine rotates when the driver demand pedal is not applied, when the engine is operating at its warm operating temperature (e.g., 95 degrees Celsius), when the vehicle in which the engine operates is in gear (e.g., the vehicle's transmission is engaged in "D" or drive) or in neutral, and when vehicle speed is zero. The engine may be a spark ignited engine as shown in FIG. 1, or alternatively, a compression ignition engine. The engine may be included in a vehicle as shown in FIG. 2. The engine may operate according to the sequence of FIG. 3 and the method of FIGS. 4 and 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Intake cam 51 and exhaust cam 53 are covered via cam cover 59.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from intake boost chamber 46. Turbocharger compressor 162 draws air from air intake 42 to supply boost chamber 46. Exhaust gases spin turbine 164 which is coupled to compressor 162 via shaft 161. Turbocharger waste gate 163 may be opened to reduce boost pressure, or it may be closed to increase boost pressure.

Engine crankcase 193 may receive fresh air from the engine intake air system at a location upstream of throttle 62. For example, engine crankcase 193 may receive fresh air from the engine intake air system 42 at a location downstream of compressor 162. However, in some examples compressor 162 may be omitted. Thus, the engine crankcase may be ventilated by drawing air from the engine air intake system at a higher pressure location, and returning the air to the engine air intake system at a lower pressure location as discussed in more detail in the description of FIG. 2. Engine crankcase 193 may be bounded by oil pan 191 and engine block 196. Oil pan 191 may retain oil 195.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory (RAM) 108, keep alive memory 110, and a conventional data bus. Controller 12 is shown receiving various signals from sensors coupled to engine 10, in addition to those signals previously discussed, including: engine coolant temperature from temperature sensor 112 coupled to cooling sleeve 114; a position sensor 134 coupled to a driver demand pedal 130 for sensing driver demand adjusted by human driver 132; a knock sensor for determining ignition of end gases (not shown); a measurement of engine manifold pressure from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); a measurement of engine knock from knock sensor 131, and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Engine 10 and controller 12 may be included in a vehicle 100. In some examples, vehicle 100 may be a hybrid vehicle with multiple sources of torque available to one or more vehicle wheels 155. In other examples, vehicle 100 is a conventional vehicle with only an internal combustion engine 10, or an electric vehicle with only electric machine(s) 153. In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. Electric machine 153 is shown directly coupled to transmission 157. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

Controller 12 may also receive input including requests to perform operations via human/machine interface 13. Human/machine interface 13 may be a touch screen display, key pad, or other known interface. In addition, controller 12 may display vehicle status information and control variables and parameters via human/machine interface 13.

Referring now to FIG. 2, a schematic depiction of engine in vehicle 100 is shown. Vehicle body 230 may be coupled to vehicle chassis 232 via body mounts 212, and mechanical vibration sensors (e.g., accelerometers) 202 may be coupled to the vehicle body 230 at or near the body mounts 212 attachment points to detect engine vibrations that may be transmitted to the vehicle body 230. Ladder frame 214 or vehicle chassis 232 may support engine 10 and mechanical vibration sensors 202 may be coupled to ladder frame 214 or vehicle chassis 232 to detect engine vibrations. Inside of passenger cabin 250, mechanical vibration sensors 202 may be coupled to steering column 208 and seat rails 210. Output (e.g., electric signals) from mechanical vibration sensors 202 may be filtered via a band pass filter 260. Band pass filter 260 may be a hardware or software filter that passes frequencies in a predetermined range (e.g., 5-100 hertz) and attenuates all other frequencies that are output from mechanical vibration sensors 202.

Sound in passenger cabin 250 may be sensed via microphone 204, and output of microphone 204 may be filtered via a band pass filter 262. Band pass filter 262 may be a hardware or software filter that passes or less significantly attenuates frequencies in a predetermined range (e.g., 20-800 hertz) and attenuates all other frequencies that are output from microphone 204.

Sound in the passenger cabin 250 may be attenuated via active noise canceling system 220 and/or active vibration canceling system. Active noise canceling system 220 may detect sounds in passenger cabin 250 via microphone 205 and output signals that are 180 degrees out of phase, or the inverse of the detected sounds, to speaker 206. In this way, the net sound pressure level at specific frequencies in passenger cabin 250 may be reduced via noise canceling system 220. The output of microphone 205 may be processed via a band pass filter 221a. Band pass filter 221a may be a hardware or software filter that passes of less significantly attenuates frequencies in a predetermined range (e.g., 20-800 hertz) and attenuates all other frequencies that are output from microphone 204. Active noise canceling system 220 may include an amplifier 221 that may include filter 221a. Amplifier 221 may communicate its operational status to controller 12 via a controller area network 275.

In some examples, a smart cellular phone 299 that includes an accelerometer 299a and/or a microphone 299m may monitor noise and/or vibrations in vehicle 100. The smart cellular phone 299 may communicate when noise or vibration levels are exceeded to controller 12 so that the baseline engine idle speed may be adapted.

Thus, the system of FIGS. 1 and 2 provides for a system, comprising: an engine; an active noise cancelling system; and a controller including executable instructions stored in non-transitory memory that cause the controller to reduce a speed of the engine while the engine is idling and while output of the microphone is less than a first threshold level while the active noise cancelling system is reducing audible sounds in a passenger cabin of a vehicle. The engine system further comprises additional instructions to reduce the speed of the engine while output of the microphone is less than a second threshold while the active noise cancelling is not reducing audible sounds in the passenger cabin of the vehicle. The engine system further comprises additional instructions to adjust a base idle speed of the engine to a present speed of the engine in response to output of the microphone being substantially equal (e.g., within ±5% of the threshold value) to the first threshold while the active noise cancelling system is reducing audible sound in the passenger cabin of the vehicle. The engine system further comprises additional instructions to adjust a base idle speed of the engine to a present speed of the engine in response to output of the microphone being substantially equal (e.g., within ±5% of the threshold value) to the second threshold while the active noise cancelling system is not reducing audible sound in the passenger cabin of the vehicle. The engine system includes where the active noise cancelling system includes a speaker in the passenger cabin. The engine system includes where the active noise cancelling system includes a microphone in the passenger cabin. The engine system further comprises a vibration sensor and additional instructions to reduce the speed of the engine while the engine is idling and while output of the vibration sensor is less than third threshold. The engine system includes where the vibration sensor is in the passenger cabin of the vehicle.

Figure 3:
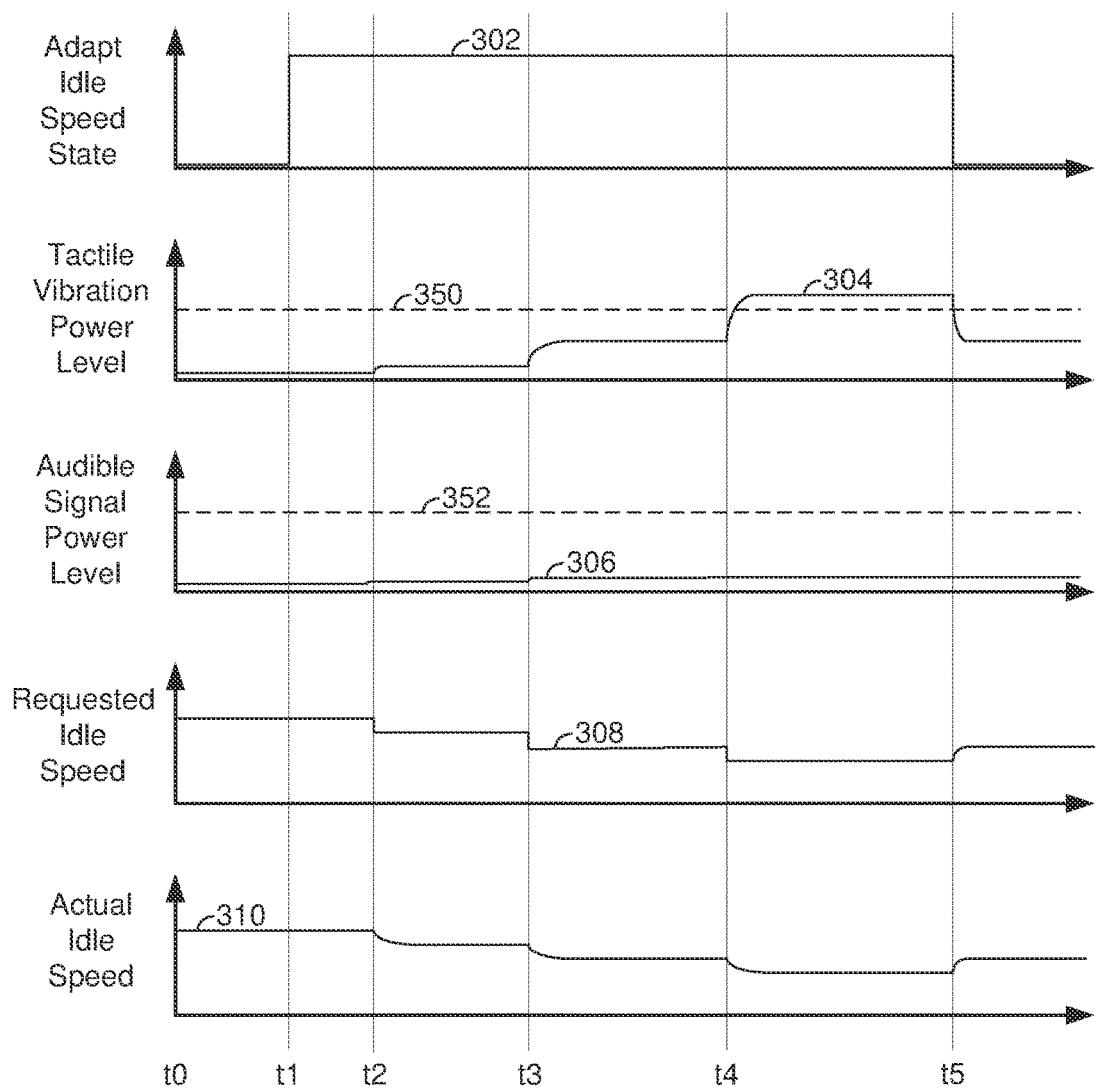
FIG. 3 shows an example engine operating sequence according to the method of FIGS. 4 and 5, and the system of FIGS. 1 and 2.

Referring now to FIG. 3, plots of prophetic engine idle adjustment procedure are shown. The sequence of FIG. 3 may be provided by the system of FIGS. 1 and 2 in cooperation with the method of FIGS. 4 and 5. The plots of FIG. 3 are time aligned and they begin and end at the same times. The vertical lines t0-t5 represent times of interest in the sequence.

The first plot from the top of FIG. 3 is a plot of an adapt base engine idle speed state versus time. The vertical axis represents the state of base engine idle speed adaption and base engine idle speed adaption is activated when trace 302 is at a higher level near the vertical axis arrow. The base engine idle speed adaption is not activated when trace 302 is at a level that is near the horizontal axis. The horizontal axis represents time and time increases from the left side of the plot to the right side of the plot. Trace or line 302 represents the base engine idle speed adapt status.

The second plot from the top of FIG. 3 is a plot of a tactile vibration level (e.g., a level of vibrations in mechanical systems that may be felt by one or more humans) versus time. The vertical axis represents the tactile vibration level and the tactile vibration level increases in the direction of the vertical axis arrow. The horizontal axis represents time and time increases from the left side of the plot to the right side of the plot. Trace or line 304 represents the tactile vibration level. Horizontal line 350 represents a tactical vibration level that is not to be exceeded.

The third plot from the top of FIG. 3 is a plot of an audible sound pressure level (e.g., a pressure level of sound that may be heard by vehicle occupants) in a vehicle passenger cabin versus time. The vertical axis represents the audible sound pressure level in the passenger cabin and the audible sound pressure level increases in the direction of the vertical axis arrow. The horizontal axis represents time and time increases from the left side of the plot to the right side of the plot. Trace or line 306 represents the sound pressure level. Horizontal line 352 represents a sound pressure level that is not to be exceeded.

The fourth plot from the top of FIG. 3 is a requested engine idle speed versus time. The vertical axis represents the requested engine idle speed and the requested engine idle speed increases in the direction of the vertical axis arrow. The horizontal axis represents time and time increases from the left side of the plot to the right side of the plot. Trace 308 represents the requested engine idle speed.

The fifth plot from the top of FIG. 3 is an actual engine idle speed versus time. The vertical axis represents the actual engine idle speed and the actual engine idle speed increases in the direction of the vertical axis arrow. The horizontal axis represents time and time increases from the left side of the plot to the right side of the plot. Trace 310 represents the actual engine idle speed.

At time t0, the engine is running (e.g., rotating and combusting fuel) (not shown) at a base idle speed (not shown) and the base engine idle speed is not being adapted. The tactile vibration level is low and the audible sound pressure level is also low. The requested engine idle speed is a base engine idle speed that has not been adapted. The actual engine idle speed is equal to the requested engine idle speed.

At time t1, adaptation of the base engine idle speed is asserted. The engine continues to operate at the non-adapted engine idle speed and the tactile vibration level is low. The audible sound pressure level is also low and the requested engine idle speed is the base engine idle speed. The actual engine idle speed is equal to the base engine idle speed.

At time t2, the requested engine idle speed is reduced and the tactile vibration level begins to increase. The actual engine idle speed begins to decline so that it may match the requested engine idle speed, and the audible sound pressure level begins to increase. The tactile vibration and audible sound pressure levels may increase as engine speed decreases since combustion events within the engine begin to spread farther apart, because the vehicle is typically more sensitive to lower frequency engine excitation. The tactile vibration and audible sound pressure levels may be affected by the rate of combustion in the engine's cylinders and other operating conditions. The tactile vibration and audible sound pressure levels remain below their respective thresholds.

At time t3, the requested engine idle speed is reduced further since neither threshold 350 or 352 has been achieved. The actual engine speed is reduced to match the requested engine speed. The tactile vibration and audible sound pressure levels increase again, but the tactile vibration level begins to increase at a higher rate.

At time t4, the requested engine idle speed is reduced yet again, but this time threshold 350 is exceeded by the tactile vibration level shortly after time t4. The audible sound pressure level remains below threshold 352 and the actual engine idle speed is reduced to the requested engine idle speed. Since threshold 350 was exceeded, the base engine idle speed is adapted or changed to the level of the requested engine idle speed at time t3 when threshold 350 was not exceeded. This may allow the engine to operate at a lower idle speed to conserve fuel.

At time t5, the requested engine idle speed is adjusted to the new adapted engine base idle speed. The tactile vibration level is reduced such that threshold 350 is not exceeded shortly after time t5 and the audible sound pressure level threshold 352 is not exceeded. The adapt base engine idle speed state is not asserted since the base idle speed was adapted between time t4 and time t5 to the level of the requested engine idle speed at time t3.

In this way, a base engine idle speed value may be adapted so that a base engine idle speed for a particular vehicle configuration may be determined after a vehicle's base idle speed is initially programmed. The adaption procedure may include progressively ramping or stepping requested engine idle speed down until an audible sound pressure level or vibration level threshold is exceeded. Once the audible sound pressure level threshold or vibration level threshold is exceeded, the base engine idle speed is adjusted to the most recent requested engine idle speed that did not cause the audible sound pressure level threshold or the vibration level threshold to be exceeded.

Figure 4:
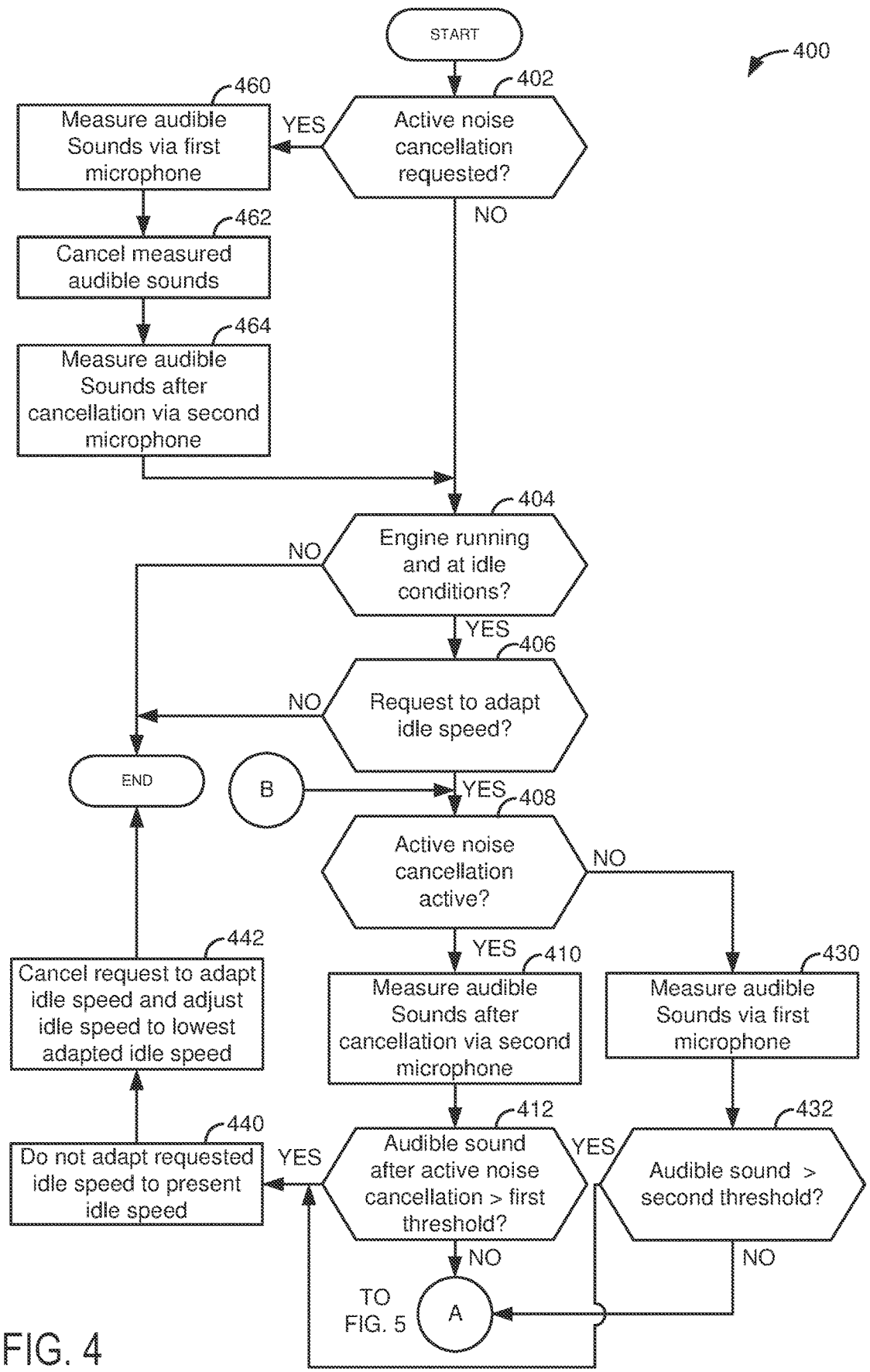
FIGS. 4 and 5 show a method for operating an engine.
Figure 5:
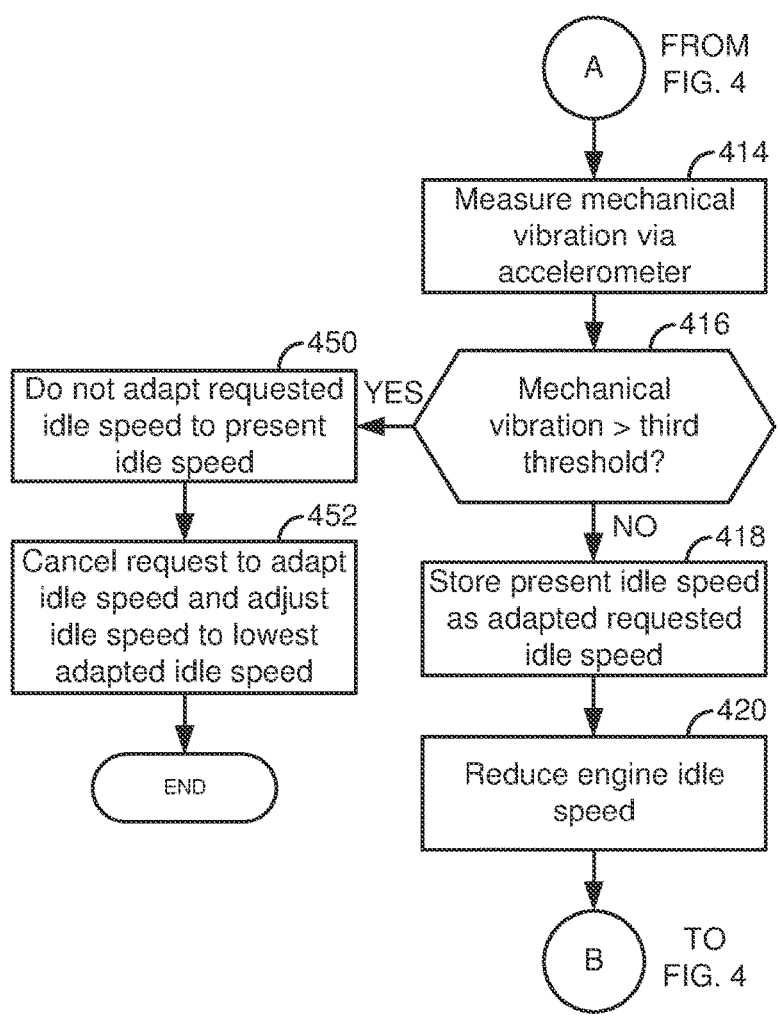

Referring now to FIGS. 4 and 5, a flowchart of an example method for adapting a base engine idle speed is shown. The method of FIGS. 4 and 5 may be performed in cooperation with the system of FIGS. 1 and 2. In addition, at least portions of the method of FIGS. 4 and 5 may be incorporated as executable instructions stored in non-transitory memory while other portions of the method may be performed via one or more controllers transforming operating states of devices and actuators in the physical world.

At 402, method judges if active noise cancellation for the vehicle passenger cabin is requested. Active noise cancellation may be requested via a human/machine interface, or automatically by a controller according to vehicle operating conditions. For example, active noise cancellation may be activated for a vehicle economy mode and deactivated for a vehicle sport or track mode. If method 400 judges that active noise cancellation is activated, the answer is yes and method 400 proceeds to 460. Otherwise, the answer is no and method 400 proceeds to 404.

At 460, method 400 measures audible sounds in a passenger compartment via a microphone. Output of the microphone may be processed through a band pass filter as previously described. The band pass filter attenuates frequencies output from the microphone that are not in the band pass filter's pass band. The band pass filter may not attenuate frequencies output from the microphone that are in the band pass filter's pass band (e.g., frequency range). In one example, the pass band may be frequencies that may correspond to frequencies of the engine where higher noise levels may be generated by the engine. Method 400 proceeds to 462.

At 462, method 400 cancels measured sounds that are in the band pass filter's pass band. In particular, an amplifier inverts the signal that is output from the first microphone and it delivers the inverted signal to a speaker. The sound that is output by the speaker interferes with the measured sound, thereby cancelling at least a portion of the measured sound. Method 400 proceeds to 464.

At 464, method 400 measures audible sounds in the vehicle passenger cabin via a second microphone. The output of the second microphone may also be band pass filtered. Method 400 proceeds to 404.

At 404, method 400 judges if the engine is running (e.g., rotating and combusting fuel) at baseline idle conditions. Method 400 may judge if the engine is operating at baseline idle conditions based on driver demand pedal position, vehicle speed, and engine speed. If method 400 judges that the engine is operating at baseline idle conditions, the answer is yes and method 400 proceeds to 406. Otherwise, the answer is no and method 400 exits.

At 406, method 400 judges if there is a request to adapt the engine's based idle speed. The engine's base idle speed may be requested to be adapted based on input from a human/machine interface (e.g., a dashboard menu or phone app or programming tool), vehicle operating conditions (e.g., after the vehicle has operated for a threshold time or traveled a threshold distance), or at an end of a vehicle assembly line. In some examples, the engine's base idle speed may be adapted in response to a technician indicating that a vehicle upfit is complete. Further, if output of an accelerometer or microphone exceeds a threshold level during engine idle, a controller may automatically adapt the base engine idle speed or query a human vehicle driver if idle speed adaptation is desired. If method 400 judges to adapt the engine idle speed, the answer is yes and method 400 proceeds to 408. Otherwise, the answer is no and method 400 proceeds to exit.

At 408, method judges if active noise cancellation for the vehicle passenger cabin is activated. If method 400 judges that active noise cancellation is activated, the answer is yes and method 400 proceeds to 410. Otherwise, the answer is no and method 400 proceeds to 430.

At 410, method 400 measures audible sounds within the passenger cabin via a second microphone. Measuring of audible sounds may include sampling output of the second microphone via an analog to digital converter of the controller. The second microphone outputs an electric signal that may be input to a band pass filter. The band pass filter may be a hardware or software filter. The band pass filter may attenuate frequencies that are output from the second microphone and that are outside of the pass band of the band pass filter. In one example, the pass band may be 20-20,000 Hz. The band pass filter may reside in a controller. Method 400 proceeds to 412.

At 412, method 400 judges if sound pressure level from the second microphone is in a predetermined frequency range that is substantially equal to (e.g., within ±5% of the first threshold level) a first threshold level. Alternatively, method 400 may judge if maximum output of the second microphone exceeds a first threshold level. If so, the answer is yes and method 400 proceeds to 440. However, in some examples, method 400 may proceed to 414 if the output of the second microphone is substantially equal (e.g., within ±5% of the threshold level) to the first threshold level. Further, method 400 may proceed to 414 if output power of the second microphone sensor does not exceed the first threshold level.

At 414, method 400 measures mechanical vibrations on the vehicle. The mechanical vibrations may be measured via an accelerometer or other vibration sensor at the engine, driver seat, steering column, vehicle body mounts, or other locations on the vehicle. The vibration sensor may output an electric signal and the electric signal may be filtered via a hardware or software band pass filter. In one example, the output of the vibration sensor filter may have a pass band of 5-100 hertz. Frequencies above and below the pass band may be attenuated. Measuring of mechanical vibrations may include sampling output of the vibration sensor via an analog to digital converter of the controller. The band pass filter may reside in a controller. Method 400 proceeds to 416.

At 416, method 400 judges if measured vibration level is substantially equal (e.g., within ±5% of the third threshold level) to a third threshold level. Alternatively, method 400 may judge if maximum output of the vibration sensor exceeds a third threshold level. If so, the answer is yes and method 400 proceeds to 450. However, method 400 may proceed to 418 if the output of the mechanical vibration sensor is substantially equal (e.g., within ±5% of the threshold level) to the third threshold level. Further, method 400 may proceed to 418 if output power of the mechanical vibration sensor does not exceed the third threshold level.

At 418, method 400 updates the base engine idle speed to the present engine idle speed. In other words, the base engine idle speed is made equal to the present engine idle speed. In this way, the baseline idle speed may be adapted to a lower value if vehicle cabin noise and vibration are below threshold levels. Method 400 proceeds to 420.

At 420, method 400 progressively reduces the requested engine idle speed. Method 400 may reduce the requested engine idle speed and control the engine to the requested engine idle speed via closing a throttle or an air control valve to reduce engine air flow. In addition, method 400 may reduce an amount of fuel that is injected to the engine each engine cycle so as to reduce engine torque. Method 400 may also adjust engine spark timing to lower the base engine idle speed. Method 400 returns to 408.

At 450, method 400 does not adapt the base engine idle speed to the present engine speed. Since the third threshold has been exceeded, the present engine speed may be too low for desired engine operation. Method 400 proceeds to 452.

At 452, method 400 cancels the request to adapt the base engine idle speed further. The base engine idle speed may be left at its most recent adapted value (e.g., the value determined at 418). Method 400 adjusts the requested engine speed to the base engine idle speed. Method 400 proceeds to exit.

At 430, method 400 measures audible sounds within the passenger cabin via a first microphone. Measuring of audible sounds may include sampling output of the first microphone via an analog to digital converter of the controller. The first microphone outputs an electric signal that may be input to a band pass filter. The band pass filter may be a hardware or software filter. The band pass filter may attenuate frequencies that are output from the first microphone and that are outside of the pass band of the band pass filter. In one example, the pass band may be 20-20,000 Hz. Signals in the pass band may not be substantially filtered. The band pass filter may reside in a controller. Method 400 proceeds to 432.

At 432, method 400 judges if sound pressure level from the first microphone is substantially equal to (e.g., within ±5% of the second threshold level) a second threshold level. Alternatively, method 400 may judge if maximum output of the first microphone exceeds the second threshold level. If so, the answer is yes and method 400 proceeds to 440. However, in some examples, method 400 may proceed to 414 if the output of the first microphone is substantially equal (e.g., within ±5% of the threshold level) to the second threshold level. Further, method 400 may proceed to 414 if sound pressure level of the first microphone sensor does not exceed the second threshold level. The second threshold may be greater than the first threshold.

At 440, method 400 does not adapt the base engine idle speed to the present engine speed. Since the first or second thresholds have been exceeded, the present engine speed may be too low for desired engine operation. Method 400 proceeds to 442.

At 442, method 400 cancels the request to adapt the base engine idle speed further. The base engine idle speed may be left at its most recent adapted value (e.g., the value determined at 418). Method 400 adjusts the requested engine speed to the base engine idle speed. Method 400 proceeds to exit.

In this way, a base engine idle speed may be adapted so that desired vehicle operation may be achieved with a single vehicle calibration even though some vehicle configurations may support a higher or lower base engine idle speed. The base engine idle speed may be adapted with input from vibration sensors and microphones.

Thus, the method of FIGS. 4 and 5 provides for a method for operating an engine, comprising: progressively reducing a speed of the engine via a controller such that an output of vibration sensor or a sound sensor increases to a threshold level; and adjusting a base idle speed of the engine to the speed of the engine where the output of the vibration sensor or sound sensor is substantially equal to the threshold level. The method includes where the vibration sensor or sound sensor is in a passenger cabin. The method includes where the vibration sensor or sound sensor is coupled to a vehicle chassis. The method includes where the vibration sensor or the sound sensor is contained within a smart phone that communicates with the controller. The method includes where the speed is reduced via reducing an amount of air entering the engine. The method includes where the speed of the engine is reduced via reducing an amount of fuel delivered to the engine. The method includes where the vibration sensor is an accelerometer and where the sound sensor is a microphone. The method includes where the vibration sensor and/or sound sensor are permanently installed in the vehicle. The method includes where the vibration sensor and/or sound sensor are temporarily installed for the purpose of adjusting idle speed.

The method of FIGS. 4 and 5 also provides for a method for operating an engine, comprising: attenuating output of a first sensor that is outside of a first frequency range; attenuating output of a second sensor that is outside of a second frequency range; and progressively reducing a speed of the engine via a controller such that output of the first sensor that is not attenuated is greater than a first threshold or output of the second sensor that is not attenuated is greater than a third threshold. The engine method further comprises adjusting a base idle speed of the engine to the speed of the engine where the output of the first sensor that is not attenuated is substantially equal to the first threshold. The engine method further comprises adjusting a base idle speed of the engine to the speed of the engine where the output of the second sensor that is not attenuated is substantially equal to the third threshold. The engine method further comprises adjusting engine air flow to reduce the speed of the engine. The engine method further comprises adjusting engine fuel flow to reduce the speed of the engine.

As will be appreciated by one of ordinary skill in the art, the method described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
   adjusting a base idle speed of the engine in response to an operating state of an active noise cancellation system, where adjusting the base idle speed includes:
   progressively reducing a speed of the engine and receiving an output of a vibration sensor or a sound sensor via a controller until the output of the vibration sensor or the sound sensor increases to a first threshold level; and
   adjusting the base idle speed of the engine to the speed of the engine where the output of the vibration sensor or the sound sensor is substantially equal to the first threshold level.

2. The method of claim 1, where the vibration sensor or the sound sensor is in a passenger cabin.

3. The method of claim 1, where the vibration sensor or the sound sensor is coupled to a vehicle chassis.

4. The method of claim 1, where the vibration sensor or the sound sensor is contained within a smart phone that communicates with the controller.

5. The method of claim 1, where the speed is reduced via reducing an amount of air entering the engine.

6. The method of claim 1, where the speed of the engine is reduced via reducing an amount of fuel delivered to the engine.

7. The method of claim 1, where the vibration sensor is an accelerometer and where the sound sensor is a microphone, and further comprising:
   not adapting an engine idle speed to a present engine idle speed and adapting the engine idle speed to a prior engine idle speed where a sound pressure level measured by the microphone is less than the first threshold level in response to the sound pressure level measured by the microphone being greater than the first threshold level while the active noise cancellation system is reducing audible sounds in a passenger cabin of a vehicle.

8. The method of claim 1, where progressively reducing the speed of the engine includes only reducing the speed of the engine until the output of the vibration sensor or the sound sensor increases to the first threshold level.

9. A system, comprising:
   an engine;
   an active noise cancellation system including a microphone; and
   a controller including executable instructions stored in non-transitory memory that when executed cause the controller to:
   in response to an operating state of the active noise cancellation system, progressively reduce an idle speed of the engine and receive an output of the microphone until the output of the microphone increases to a first threshold level.

10. The system of claim 9, further comprising additional instructions to adjust the idle speed based on the first threshold level in response to the operating state of the active noise cancellation system being activated, and adjust the idle speed based on a second threshold level in response to the operating state of the active noise cancellation system being inactive.

11. The system of claim 10, further comprising additional instructions to adjust a base idle speed of the engine to a present speed of the engine in response to a sound pressure level measured by the microphone being substantially equal to the first threshold level while the active noise cancellation system is reducing audible sounds in a passenger cabin of a vehicle.

12. The system of claim 11, further comprising additional instructions to adjust the base idle speed of the engine to the present speed of the engine in response to the sound pressure level measured by the microphone being substantially equal to a second threshold while the active noise cancellation system is not reducing audible sounds in the passenger cabin of the vehicle.

13. The system of claim 9, where the active noise cancellation system includes a speaker in a passenger cabin, and further comprising:
   not adapting an engine idle speed to a present idle speed and adapting the engine idle speed to a prior idle speed where a sound pressure level measured by the microphone is less than the first threshold level in response to the sound pressure level measured by the microphone being greater than the first threshold level while the active noise cancellation system is reducing audible sounds in the passenger cabin of a vehicle.

14. The system of claim 9, where the microphone is in a passenger cabin.

15. The system of claim 9, further comprising a vibration sensor and additional instructions to reduce a speed of the engine while the engine is idling and while a vibration level measured by the vibration sensor is less than third threshold.

16. The system of claim 15, where the vibration sensor is in a passenger cabin of a vehicle.

17. A method for operating an engine, comprising:
   in response to an active noise cancellation request, measuring audible sounds via a first microphone via a controller;
   in response to an absence of the active noise cancellation request, measuring audible sounds via the first microphone via the controller;
   in response to a sound pressure level determined by the first microphone exceeding a second threshold level in the absence of the active noise cancellation request, not adjusting an engine idle speed;
   in response to the sound pressure level determined by the first microphone not exceeding the second threshold level in the absence of the active noise cancellation request, adjusting the engine idle speed; and
   in response to the sound pressure level determined by a second microphone being less than a first threshold level in a presence of the active noise cancellation request, adjusting the engine idle speed, where adjusting the engine idle speed includes:
progressively reducing a speed of the engine via the controller while receiving a bandpass filtered output of a first sensor and a bandpass filtered output of a second sensor until the bandpass filtered output of the first sensor is greater than a first threshold or the bandpass filtered output of the second sensor is greater than a third threshold.

18. The method of claim 17, further comprising adjusting a base idle speed of the engine to the speed of the engine where the bandpass filtered output of the first sensor is substantially equal to the first threshold.

19. The method of claim 17, further comprising adjusting a base idle speed of the engine to the speed of the engine where the bandpass filtered output of the second sensor is substantially equal to the third threshold.

20. The method of claim 17, further comprising:
adjusting engine air flow to reduce the speed of the engine; and
progressively reducing the speed of the engine via the controller such that the bandpass filtered output of the first sensor is greater than a second threshold when an active noise cancellation system is inactive.

* * * * *